(12) United States Patent
Satou et al.

(10) Patent No.: US 8,827,250 B2
(45) Date of Patent: Sep. 9, 2014

(54) VIBRATION REDUCTION DEVICE

(75) Inventors: Yuusuke Satou, Ebina (JP); Masahiko Kondou, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 250 days.

(21) Appl. No.: 13/380,254

(22) PCT Filed: Jun. 2, 2010

(86) PCT No.: PCT/JP2010/059727
§ 371 (c)(1),
(2), (4) Date: Dec. 22, 2011

(87) PCT Pub. No.: WO2011/001799
PCT Pub. Date: Jan. 6, 2011

(65) Prior Publication Data
US 2012/0098177 A1 Apr. 26, 2012

(30) Foreign Application Priority Data
Jul. 2, 2009 (JP) ................................ 2009-157563

(51) Int. Cl.
*F16F 5/00* (2006.01)
(52) U.S. Cl.
CPC .................................... *F61F 7/1011* (2013.01)
USPC ................. 267/140.14; 267/140.11; 267/292; 384/268
(58) Field of Classification Search
USPC ............... 248/60, 610, 636, 638; 267/140.14, 267/140.11, 141, 141.2, 140.5, 292; 384/268, 430
See application file for complete search history.

(56) References Cited

U.S. PATENT DOCUMENTS

| 4,351,515 | A | * | 9/1982 | Yoshida | 267/225 |
| 4,406,344 | A | * | 9/1983 | Fukushima | 180/300 |
| 4,610,420 | A |   | 9/1986 | Fukushima et al. | |
| 4,869,474 | A | * | 9/1989 | Best et al. | 267/136 |
| 5,364,061 | A | * | 11/1994 | Ciolczyk et al. | 248/610 |
| 5,967,269 | A | * | 10/1999 | Kato | 188/380 |
| 7,350,778 | B2 |   | 4/2008 | Endo | |
| 2005/0212188 | A1 |   | 9/2005 | Endo | |

FOREIGN PATENT DOCUMENTS

| CN | 1670396 A | 9/2005 |
| JP | 60-172746 A | 9/1985 |
| JP | 63-124502 U | 8/1988 |
| JP | 63-287629 A | 11/1988 |
| JP | 09-273586 A | 10/1997 |
| JP | 11-166584 A | 6/1999 |
| JP | 2009-236225 A | 10/2009 |
| JP | 2009-243548 A | 10/2009 |
| WO | WO 02/42660 A1 | 5/2002 |
| WO | WO 02/42662 A1 | 5/2002 |

\* cited by examiner

*Primary Examiner* — Pamela Rodriguez
(74) *Attorney, Agent, or Firm* — Foley & Lardner LLP

(57) ABSTRACT

A vibration reduction device includes: a rod rigid body supported between an engine and a vehicle body via respective elastic bodies, a resonance frequency of which is set to be lower than an engine rigid body resonance frequency; an elastic component that is provided on the rod rigid body and caused to deform by a force acting in an axial direction of the rod rigid body; an inertial mass supported by the elastic component; and an actuator that causes the inertial mass to reciprocate in the axial direction of the rod rigid body by generating a force that is proportionate to an axial direction velocity of the rod rigid body. As a result, resonance itself can be suppressed without reducing a double vibration proofing effect.

12 Claims, 16 Drawing Sheets

| | |
|---|---|
| ⋮ | ⋮ |
| 5000rpm | AMPLITUDE 60N<br>PHASE 10deg. |
| 5500rpm | AMPLITUDE 64N<br>PHASE 13deg. |
| ⋮ | ⋮ |

FIG.11

VIBRATION REDUCTION DEVICE

TECHNICAL FIELD

This invention relates to a vibration reduction device that reduces vibration transmitted to a vehicle body from an engine.

BACKGROUND ART

In JP-H09-273586-A2, published by the Japan Patent Office in 1997, a vibrating plate is coupled to an intermediate plate that partitions a rubber portion for reducing vibration transmitted from an engine to a vehicle body into two parts. As a result, a resonance point differs between an outside rubber portion and an inside rubber portion obtained by partitioning the rubber portion. Hence, a double vibration proofing effect is obtained.

SUMMARY OF THE INVENTION

Incidentally, when a double vibration proofing effect is obtained, a transmitted force transmitted from the engine to the vehicle body at a frequency in the vicinity of the resonance point increases, and therefore, to achieve a further reduction in the vibration that is transmitted from the engine to the vehicle body, resonance itself must be suppressed.

In this case, the transmitted force at a frequency in the vicinity of the resonance point decreases when damping of the rubber portion is increased, and as a result, resonance itself is suppressed. In a high frequency band at or above a resonance frequency, however, the transmitted force increases before the damping is increased, and therefore a transmission characteristic to a vehicle body side member on the high frequency band side deteriorates. Hence, by simply increasing the damping of the rubber portion in order to suppress resonance, the double vibration proofing effect deteriorates.

It is therefore an object of this invention to provide a device capable of suppressing resonance itself without reducing a double vibration proofing effect.

To achieve this object, a vibration reduction device according to this invention includes: a rod that includes an engine attachment portion and a vehicle body attachment portion, in which a resonance frequency of a rod rigid body is lower than a bending and/or twisting resonance frequency of an engine; an elastic component that is provided on the rod and caused to deform by a force acting in an axial direction of the rod; an inertial mass supported by the elastic component; and an actuator that causes the inertial mass to reciprocate in the axial direction of the rod by generating a force that is proportionate to an axial direction velocity of the rod.

Details of this invention as well as other features and advantages thereof are set forth in the following description of the specification and illustrated in the attached figures.

BRIEF DESCRIPTION OF THE DRAWINGS

FIG. 11 is a diagram showing an example of a map for setting an excitation force in order to reduce muffled noise according to the first embodiment.

EMBODIMENTS OF THE INVENTION

Embodiments of this invention will be described below with reference to the drawings.

First Embodiment

Figure 1:
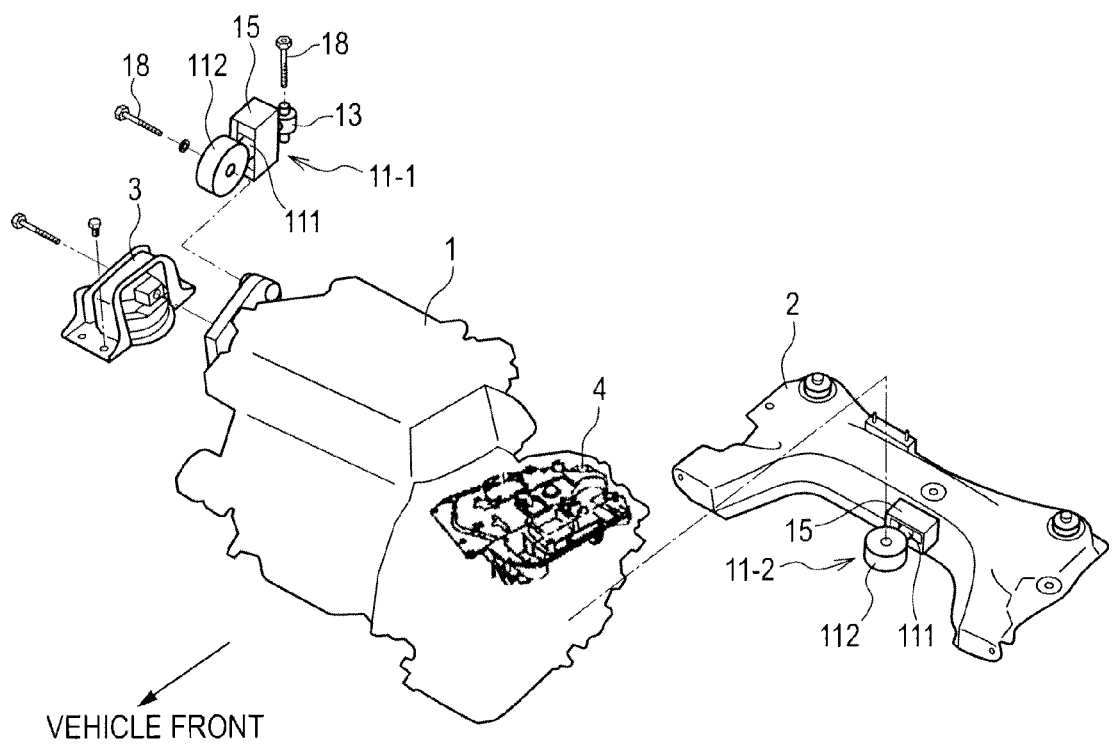
FIG. 1 is a schematic perspective view showing a condition in which a first embodiment of a vibration reduction device according to this invention is applied to a pendulum system engine mounting structure.

FIG. 1 is a schematic perspective view showing a condition in which a first embodiment of a vibration reduction device according to this invention is applied to a pendulum type engine mounting structure.

An engine 1 is an engine on which mainly only a reaction force to engine torque variation acts and an unbalanced inertial force does not act at a basic order of engine rotation, for example a four-cylinder engine including a secondary balancer or a V type six-cylinder engine. The engine 1 is a horizontal type engine in which a crankshaft is disposed in a left-right direction of a vehicle. It should be noted that in this embodiment, a vehicle right side corresponds to an engine front.

A structure for reducing vibration transmitted from the engine 1 forms a part of a structure for supporting the engine 1. The engine 1 is supported in two locations above a center of gravity by a right side engine mount 3 and a left side engine mount 4. The right side engine mount 3 supports the engine 1 from the vehicle right side. The left side engine mount 4 supports the engine 1 from a vehicle left side. This support method is known as a pendulum system.

In a pendulum system engine mounting structure, the engine 1 is tilted about an axis linking two mounting points by a rotary inertial force generated during an operation. To prevent this tilting, an upper side rod 11-1 and a lower side rod 11-2 are provided. The upper side rod 11-1 is provided on a vehicle upper right side such that one end is coupled to the engine 1 and another end is coupled to a vehicle body 2. A rod shaft portion 111 of the upper side rod 11-1 is attached horizontally. The lower side rod 11-2 is provided on a vehicle lower side such that one end is coupled to the engine 1 and another end is coupled to the vehicle body 2. The rod shaft portion 111 of the lower rod 11-2 is also attached horizontally.

At a basic order of engine rotation, mainly only a reaction force to engine torque variation acts on a four-cylinder engine including a secondary balancer or a V type six-cylinder engine, and an unbalanced inertial force does not act thereon. Hence, the present inventors learned that at the basic order, in-vehicle noise/in-vehicle vibration is generated by vibration transmitted to the vehicle body via a torque rod for supporting torque. Further, the present inventors learned that passengers are disturbed by in-vehicle noise of up to approximately 1000 Hz, which is constituted by a high order of the basic order mainly when the vehicle accelerates.

Therefore, to reduce vibration transmitted from the engine 1 to the vehicle body via the upper side rod 11-1 and the lower side rod 11-2, the present inventors propose a novel torque rod assembly to which a structure for further reducing vibration is added after forming a constitution with which a double vibration proofing effect is obtained.

It should be noted that the upper side rod 11-1 and the lower side rod 11-2 have identical basic constitutions. Accordingly, when there is no particular need to differentiate between the two, the upper side rod 11-1 and the lower side rod 11-2 will be described as a rod 11.

(Re: Constitution for Obtaining Double Vibration Proofing Effect)

Figure 2:
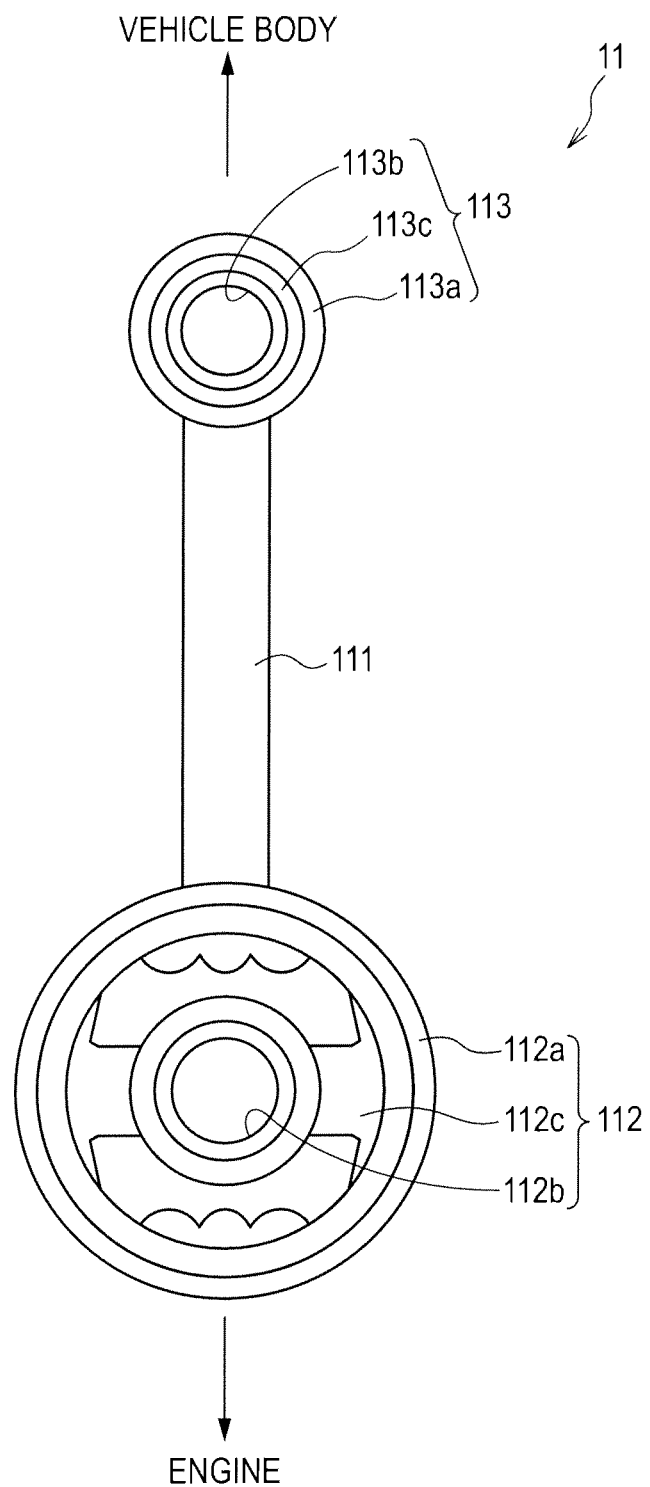
FIG. 2 is a plan view showing a torque rod with which a double vibration proofing effect is obtained.

FIG. 2 is a plan view showing a torque rod with which a double vibration proofing effect is obtained.

With the torque rod 11 shown in FIG. 2, a certain degree of vibration proofing can be expected from the double vibration proofing effect. This point will now be described.

In the torque rod 11, respective ends of the rod shaft portion 111 constitute a large end portion 112 and a small end portion 113.

The large end portion 112 includes an outer tube 112a, an inner tube 112b, and an elastic body 112c.

The outer tube 112a is welded to the rod shaft portion 111.

The inner tube 112b is concentric with the outer tube 112a. As shown in FIG. 1, a bolt 18 is inserted into the inner tube 112b to fix the inner tube 112b to the engine 1.

The elastic body 112c is interposed between the outer tube 112a and the inner tube 112b. The elastic body 112c is made of elastic rubber, for example. The elastic body 112c possesses a damping property in addition to elasticity.

A basic structure of the small end portion 113 is identical to that of the large end portion 112. In other words, the small end portion 113 includes an outer tube 113a welded to the rod shaft portion 111, an inner tube 113b that is concentric with the outer tube 112a, and an elastic body 113c interposed between the outer tube 112a and the inner tube 112b.

In this embodiment, diameters of the outer tube and the inner tube differ between the large end portion 112 and the small end portion 113. More specifically, a diameter of the outer tube 113a of the small end portion 113 is smaller than a diameter of the outer tube 112a of the large end portion 112. A diameter of the inner tube 113b of the small end portion 113 is smaller than a diameter of the inner tube 112b of the large end portion 112. Further, a rigidity of the elastic body 113c of the small end portion 113 is greater than a rigidity of the elastic body 112c of the large end portion 112.

As described above, the large end portion outer tube 112a and the small end portion outer tube 113a are welded, or in other words rigidly joined, to the rod shaft portion 111. Hence, in the following description, a component formed by welding the large end portion outer tube 112a and the small end portion outer tube 113a to the rod shaft portion 111 will be referred to where appropriate as a rod rigid body 110.

Figure 3:
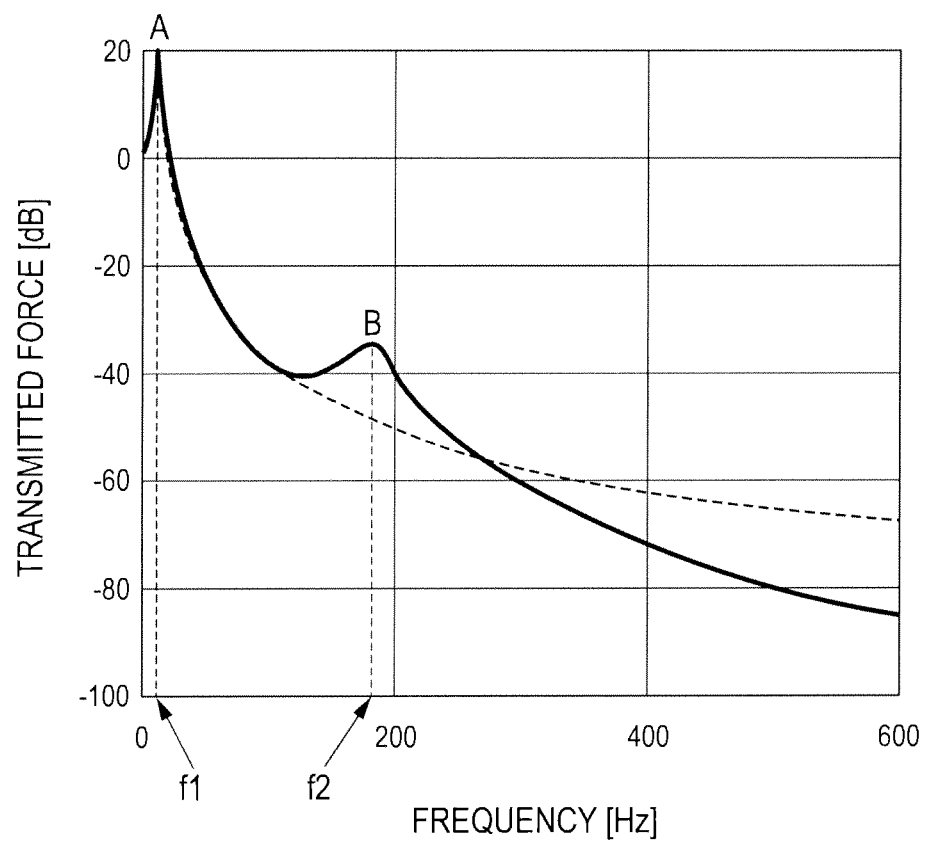
FIG. 3 is a frequency characteristic diagram showing a transmitted force generated by a constitution with which a double vibration proofing effect is obtained.

As shown by a solid line in FIG. 3, two resonance points appear on this type of torque rod.

One of the resonance points is engine rigid body resonance A. The engine rigid body is formed by joining the large end portion inner tube 112b rigidly to the engine. A resonance frequency of the engine rigid body resonance A is determined by an engine weight and a characteristic of the large end portion elastic body 112c.

The other resonance point is rod rigid body resonance B. A resonance frequency of the rod rigid body resonance B is determined by a weight of the rod rigid body 110 (in other words, the weight of the rod shaft portion 111, the large end portion outer tube 112a, and the small end portion outer tube 113b) and a characteristic of the small end portion elastic body 113c.

In a typical vehicle engine, a bending and/or twisting primary resonance frequency $f_3$ is between approximately 280 Hz and 350 Hz. Hence, the characteristic of the large end portion elastic body 112c, the weight of the rod shaft portion 111, the large end portion outer tube 112a, and the small end portion outer tube 113b, and the characteristic of the small end portion elastic body 113c are set such that the resonance frequency of the engine rigid body resonance A and the resonance frequency of the rod rigid body resonance B are smaller than the bending and/or twisting resonance frequency $f_3$ of the engine.

In this embodiment, as shown in FIG. 3, the resonance frequency of the engine rigid body resonance A is adjusted to a frequency $f_1$ [Hz] in the vicinity of substantially zero. The resonance frequency of the rod rigid body resonance B is adjusted to a frequency $f_2$ [Hz] in the vicinity of 200 Hz.

By adjusting the resonance frequencies in this manner, bending and/or twisting resonant vibration in the engine is prevented initially by a first bush and then by a second bush. Hence, bending and/or twisting resonant vibration in the engine 1 is doubly prevented such that transmission thereof to the vehicle body is suppressed.

Therefore, with the torque rod 11, a certain degree of vibration proofing can be expected from the double vibration proofing effect. It is, however, difficult to obtain a further vibration proofing effect. This point will now be described.

The rod rigid body resonance B may be suppressed in order to obtain a further vibration proofing effect with the torque rod 11. It should be noted that the engine rigid body resonance A is ignored. To suppress the rod rigid body resonance B, a damping term of the small end portion elastic body 113c may be increased.

As shown by a dotted line in FIG. 3, however, when the damping term of the small end portion elastic body 113c is increased, although a transmitted force decreases in the vicinity of the rod rigid body resonance B such that the rod rigid body resonance B itself is suppressed, the transmitted force conversely increases in a high frequency band, leading to deterioration of a transmission characteristic.

The mechanism for this is as follows.

Figure 4:
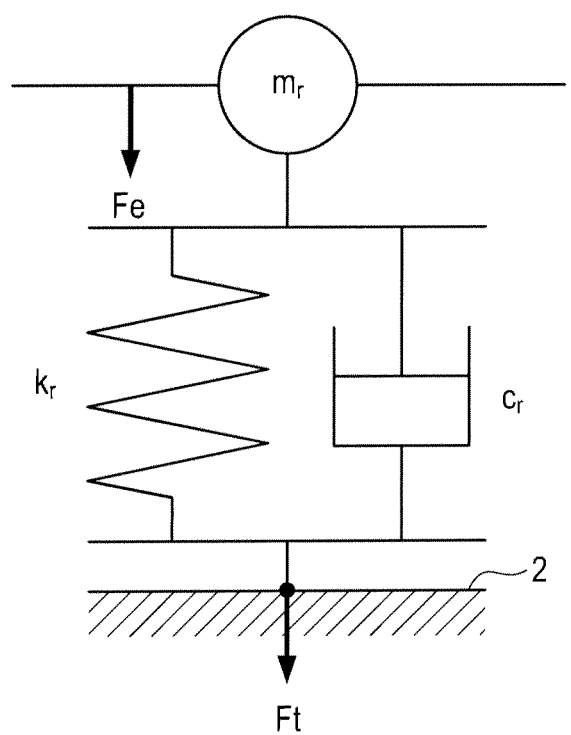
FIG. 4 is a diagram showing a physical model of a torque rod 11.

FIG. 4 is a diagram showing a physical model of the torque rod 11.

From the illustrated model, an equation of motion relating to the rod is as shown in a following Equation (1).

$$(-m_r\omega^2 + c_r i\omega + k_r)x_r = Fe \qquad (1)$$

where $m_r$ is s the weight of the rod rigid body, $x_r$ is an axial direction displacement of the rod rigid body, ω is an angular frequency,
$k_r$ is a rod axis direction spring coefficient of the small end portion,
$c_r$ is a rod axis direction damping coefficient of the small end portion,
i is an imaginary unit, and
Fe is an input from the engine via the large end portion.
Further, an input Ft into the vehicle body 2 from the rod 11 is as shown in a following Equation (2).

$$Ft = k_r x_r + c_r i \omega x_r \qquad (2)$$

where,
$x_r$ is the axial direction displacement of the rod,
ω is the angular frequency,
$k_r$ is the rod axis direction spring coefficient of the small end portion,
$c_r$ is the rod axis direction damping coefficient of the small end portion, and
i is an imaginary unit.
From Equations (1) and (2), a transmission characteristic of the torque rod 11 to the vehicle body 2 is as shown in a following Equation (3).

$$\frac{Ft}{Fe} = \frac{c_r i \omega + k_r}{-m_r \omega^2 + c_r i \omega + k_r} \qquad (3)$$

At a frequency in the vicinity of the rod rigid body resonance B, an absolute value of $m_r \omega^2$ and an absolute value of $k_r$ approach each other such that $-m_r \omega^2$ and $k_r$ cancel each other out. Therefore, the transmission characteristic to the vehicle body 2 is determined by the damping coefficient $c_r$ serving as the denominator on the right side of Equation (3).

Hence, as shown by the dotted line in FIG. 3, when the damping coefficient $c_r$ is increased, the transmitted force decreases in the vicinity of the rod rigid body resonance B, whereby the rod rigid body resonance B itself is suppressed.

The numerator on the right side of Equation (3) is determined by the rod axis direction rigidity coefficient $k_r$ of the small end portion and the rod axis direction damping coefficient $c_r$ of the small end portion. With normal damping obtained from the double vibration proofing effect, the damping coefficient $c_r$ is small and the rigidity coefficient $k_r$ is dominant. When an attempt is made to suppress the rod rigid body resonance B by increasing the damping coefficient $c_r$ of the denominator, however, the damping coefficient $c_r$ of the numerator moves in conjunction therewith. Hence, as shown by the dotted line in FIG. 3, in a frequency band exceeding the resonance frequency $f_2$ of the rod rigid body resonance B, the transmitted force transmitted to the vehicle body 2 conversely increases such that the transmission characteristic to the vehicle body 2 on the high frequency band side deteriorates.

First Embodiment

Figure 5:
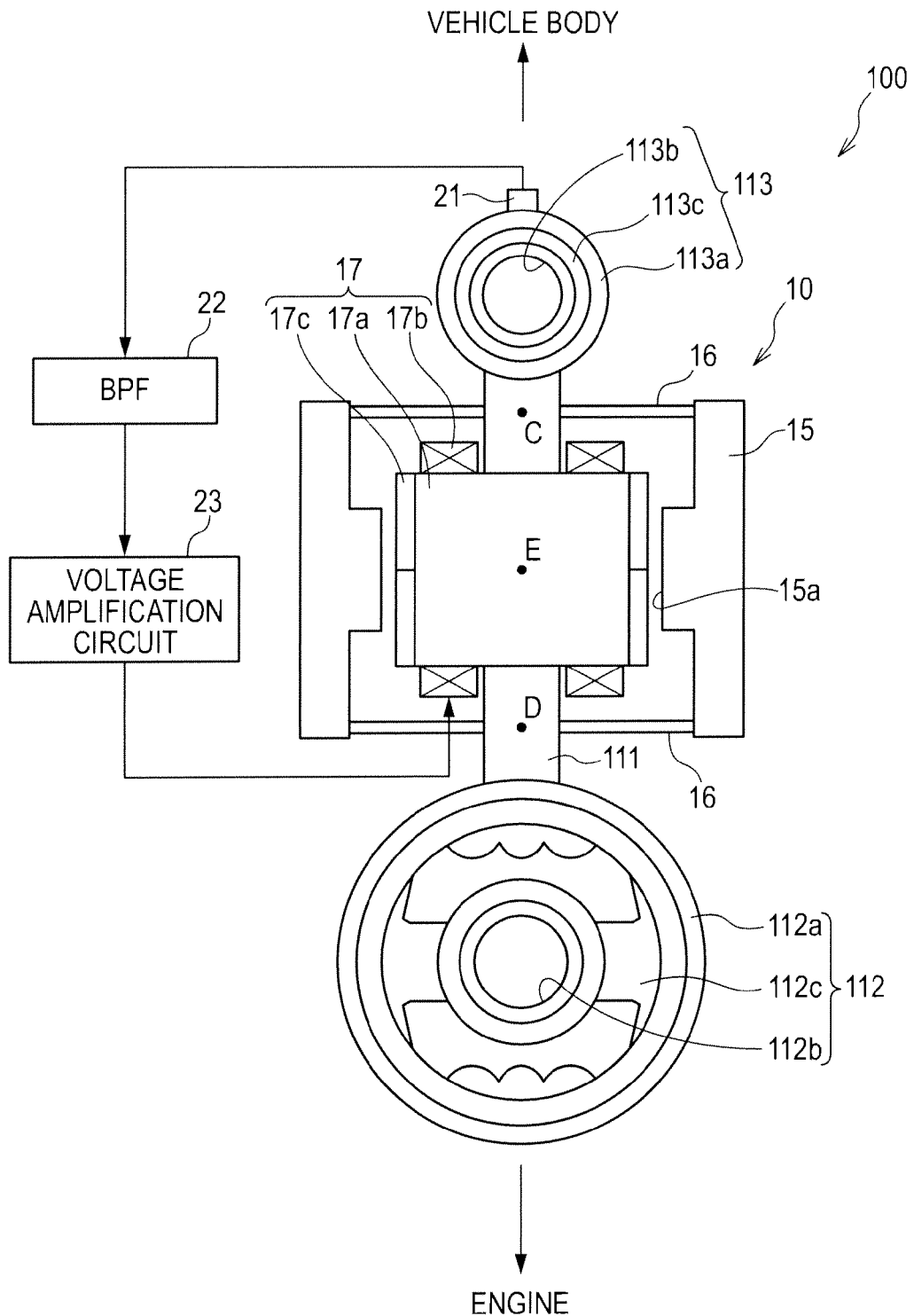
FIG. 5 is a plan view showing a torque rod assembly in a vehicle-installed condition from above.

In consideration of the above, a first embodiment of a vibration reduction device according to this invention will be described with reference to FIG. 5. FIG. 5 is a plan view showing a torque rod assembly in a vehicle-installed condition from above.

A vibration reduction device 100 includes a torque rod assembly 10, an acceleration sensor 21, a band pass filter 22, and a voltage amplification circuit 23.

The torque rod assembly 10 includes the torque rod 11, a plate spring 16, an inertial mass 15, and an actuator 17. The torque rod assembly 10 is coupled to the engine 1 at one end and to the vehicle body 2 at another end. The torque rod assembly 10 is attached such that the rod shaft portion 111 is horizontal.

Two plate springs 16 are provided on the engine side and the vehicle body side of the rod shaft portion 111. The plate spring 16 serves as an elastic component. The plate spring 16 has a comparatively low rigidity.

The inertial mass 15 is provided around the rod shaft portion 111. As shown in FIG. 1, the inertial mass 15 takes an angular tube shape. The inertial mass 15 is coaxial with the rod shaft portion 111. As shown in FIG. 5, the inertial mass 15 is fixed to both left and right ends of the plate springs 16. The vehicle body side plate spring is fixed to a vehicle body side end of a side wall of the inertial mass 15. The engine side plate spring is fixed to an engine side end of the side wall of the inertial mass 15. In other words, a fixed part between the plate springs 16 and the inertial mass 15 extends rearward from a front side of the paper surface, i.e. parallel to a gravitational direction. The inertial mass 15 is a magnetized metallic body. A cross-section of the inertial mass 15 exhibits both left-right symmetry and vertical symmetry. A center of gravity of the inertial mass 15 matches a center of the rod 11. A part of an inner wall 15a of the inertial mass 15 projects toward a permanent magnet 17c of the actuator 17.

The inertial mass 15 is supported by the plate springs 16 having a comparatively low rigidity, and therefore a resonance frequency in the rod axis direction (an up-down direction in FIG. 5) is in a low range of 10 Hz to 100 Hz. A secondary resonance frequency at an idle rotation speed in a four-cylinder engine is approximately 20 Hz, and therefore, if the resonance frequency of the inertial mass 15 is 10 Hz, the inertial mass 15 does not resonate, regardless of the operating conditions of the engine 1. When the resonance frequency of the inertial mass 15 is 10 Hz, however, the inertial mass 15 becomes extremely heavy. In a case where it is difficult to make the inertial mass 15 heavy, a sufficient distance can be obtained between the rod rigid body resonance B (200 Hz in this embodiment) and the resonance frequency of the inertial mass 15 as long as the resonance frequency of the inertial mass 15 is set to be less than approximately half the frequency of the rod rigid body resonance B. In so doing, vibration transmission can be suppressed sufficiently, as will be described below.

The actuator 17 is a linear motion type actuator that causes the inertial mass 15 to reciprocate in the rod axis direction (the up-down direction in FIG. 5). The actuator 17 generates force on the basis of a signal that is amplified by the voltage amplification circuit 23 and then subjected to sign reversal, as will be described below. Thus, velocity feedback control for increasing damping of the rod 11 serving as a control subject is performed.

The actuator 17 is provided in a space between the inertial mass 15 and the rod shaft portion 111. The actuator 17 includes a core 17a, a coil 17b, and the permanent magnet 17c.

The core 17a takes an angular tube shape, and is fixed to the rod shaft portion 111. The core 17a is constituted by a plurality of laminated steel plates. The core 17a forms a magnetic path of the coil 17b. The steel plates of the core 17a are fixed around the rod shaft portion 111 by an adhesive to form the entire angular tube-shaped core 17a. The coil 17b is wound around the core 17a. The permanent magnet 17c is provided on an outer peripheral surface of the core 17a.

When the actuator 17 is constituted in this manner, a reactance torque generated by a magnetic field that is generated by the coil 17b and the permanent magnet 17c causes the inertial mass 15 to reciprocate in the rod axis direction.

The acceleration sensor 21 detects acceleration in axial direction vibration of the rod 11. The acceleration sensor 21 is attached to a tip end of the small end portion 113 on an axis line of the rod 11. The reason for this will be described below.

The band pass filter 22 passes signals of a predetermined frequency, from among signals input from the acceleration sensor 21, and cuts signals of frequencies other than the predetermined frequency. More specifically, the band pass filter 22 passes a lower limit frequency $f_5$ of a vibration proofing region, including at least the resonance frequency $f_2$ of the rod rigid body resonance B. The lower limit frequency of the vibration proofing region is a frequency at which a transmittance reaches a multiple of one, or more specifically a frequency determined by multiplying a predetermined value ($\sqrt{2}$) by the resonance frequency $f_2$ of the rod rigid body resonance B. More preferably, the band pass filter 22 passes signals up to an upper limit (400 Hz, for example) at which control is not dispersed. In other words, the band pass filter 22 does not pass signals of a frequency exceeding the upper limit (400 Hz, for example) at which control is not dispersed.

Further, the band pass filter 22 passes frequencies at or above a rod axis direction resonance frequency of the inertial mass 15. In other words, the band pass filter 22 does not pass frequencies lower than the rod axis direction resonance frequency of the inertial mass 15. The rod axis direction resonance frequency of the inertial mass 15 is determined by the weight of the inertial mass 15 and the rigidity of the plate spring 16, and set between approximately 10 Hz and 100 Hz. As described above, the secondary resonance frequency at an idle rotation speed in a four-cylinder engine is approximately 20 Hz, and therefore, when the rod axis direction resonance frequency of the inertial mass 15 is set at 20 Hz, coupling may occur. Accordingly, a passing frequency of the band pass filter 22 is preferably set so as to avoid coupling.

Hence, in this invention, control is not performed at unnecessary frequencies. Therefore, an improvement in control stability can be achieved, and the transmitted force can be suppressed reliably within a target frequency range while suppressing excessive power consumption.

The voltage amplification circuit 23 amplifies a signal input from the band pass filter 22. More specifically, the voltage amplification circuit 23 amplifies a rod axis direction velocity of the vibration detected by the acceleration sensor 21. The voltage amplification circuit 23 then performs voltage control by energizing the coil 17b of the actuator 17. The voltage amplification circuit 23 is an operational amplifier, for example.

This will now be described further.

Figure 6:
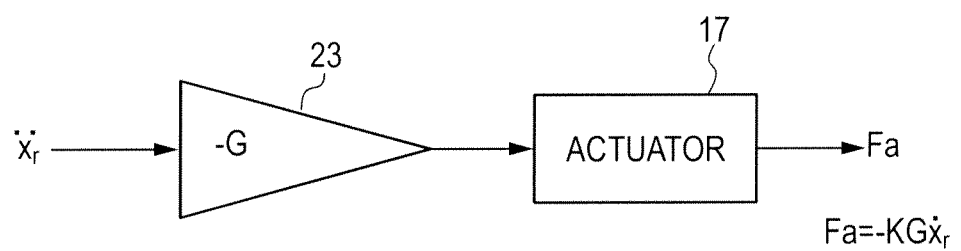
FIG. 6 is a block diagram functionally representing a voltage amplification circuit 23 and an actuator 17.

FIG. 6 is a block diagram functionally representing the voltage amplification circuit 23 and the actuator 17.

An axial direction acceleration $\ddot{x}_r$ of the rod 11 is detected by the acceleration sensor 21.

The voltage amplification circuit 23 outputs $-G\ddot{x}_r$ by multiplying a gain $-G$ by the axial direction acceleration $\ddot{x}_r$.

In the actuator 17, the coil 17b acts as an integrator. Hence, the actuator 17 outputs $-G\dot{x}_r$. As a result, a force Fa generated by the actuator 17 is proportionate to $\dot{x}_r$, and an orientation thereof is opposite to that of the acceleration. In other words, velocity feedback control for increasing damping of the rod 11 serving as the control subject is performed.

Figure 7:
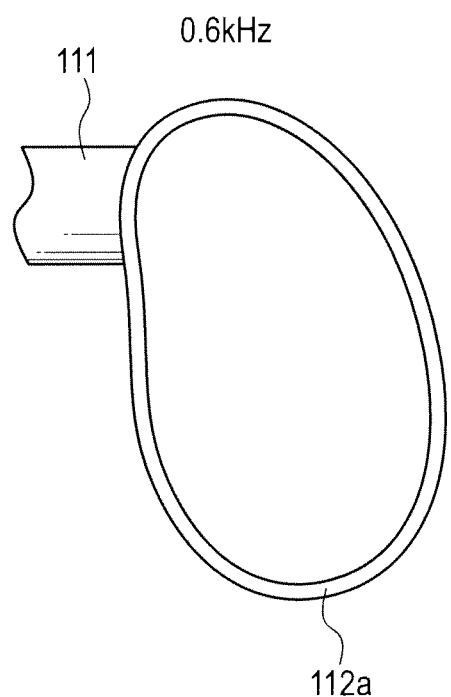
FIG. 7 is an enlarged diagram showing deformation of an outer tube 112a of a large end portion 112 when an engine rigid body resonance A is generated in the large end portion 112.

FIG. 7 is an enlarged diagram showing deformation of the outer tube 112a of the large end portion 112 when the engine rigid body resonance A is generated in the large end portion 112.

As noted above, the resonance frequency $f_1$ of the engine rigid body resonance A is close to zero. In this case, the large end portion outer tube 112a deforms greatly. The vibration of the rod 11 does not match vibration of the large end outer tube 112a. Therefore, by attaching the accelerator sensor 21 to a tip end of the large end portion 112 on the axis line of the rod 11, an effect of the great deformation of the large end portion outer tube 112a is received such that the control is dispersed.

The small end portion outer tube 113a, on the other hand, has a greater rigidity than the large end portion outer tube 112a and is therefore less likely to deform. Hence, in this embodiment, the acceleration sensor 21 is disposed on the small end portion outer tube 113a.

Figure 8:
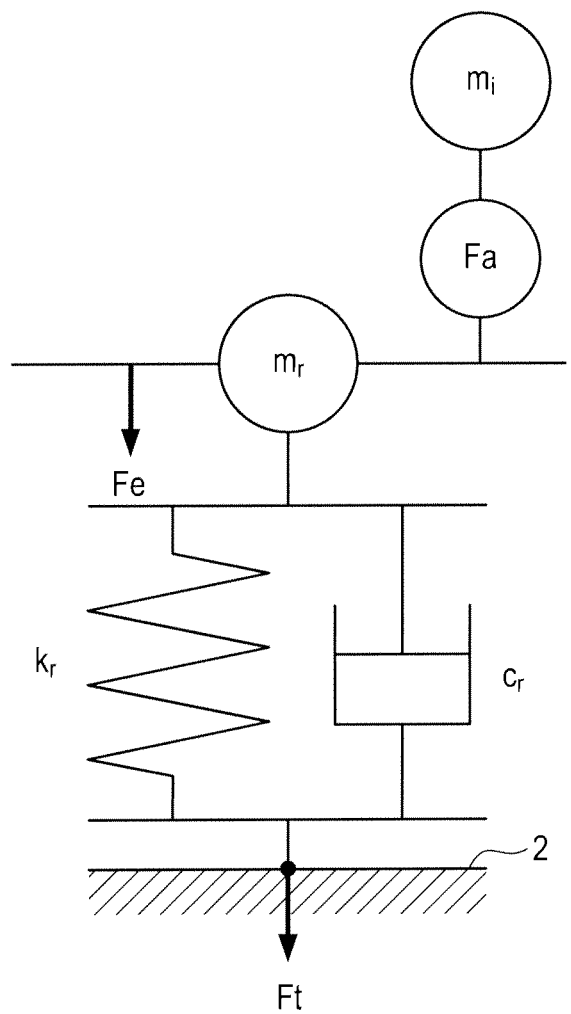
FIG. 8 is a diagram showing a physical model of a torque rod assembly according to the first embodiment.

FIG. 8 is a diagram showing a physical model of the torque rod assembly.

In this invention, in order to suppress the rod rigid body resonance B, the engine rigid body resonance A is ignored. Further, actual attachment points of the inertial mass 15 are set in two locations, namely a C point and D point in FIG. 5. On the physical model shown in FIG. 8, an E point serving as an average position of the C point and the D point is handled as "the attachment point of the inertial mass 15".

From the illustrated model, an equation of motion relating to the rod is as shown in a following Equation (4).

$$(-m_r\omega^2 + c_r i\omega + k_r)x_r = Fe + Fa \qquad (4)$$

where $m_r$ is the weight of the rod rigid body, $x_r$ is an axial direction displacement of the rod rigid body, $\omega$ is an angular frequency, $k_r$ is a rod axis direction spring coefficient of the small end portion, $c_r$ is an axial direction damping coefficient of the small end portion, i is an imaginary unit, Fe is the input from the engine via the large end portion, and Fa is the force generated by the actuator.

Further, the input Ft into the vehicle body 2 from the rod 11 is as shown in a following Equation (5).

$$Ft = k_r x_r + c_r i\omega x_r \qquad (5)$$

where $x_r$ is the axial direction displacement of the rod rigid body, $\omega$ is the angular frequency, $k_r$ is the rod axis direction spring coefficient of the small end portion, $c_r$ is the axial direction damping coefficient of the small end portion, and i is an imaginary unit.

Furthermore, in this embodiment, the actuator 17 generates a force Fa represented by a following Equation (6).

$$Fa = -Gi\omega x_r \qquad (6)$$

where $x_r$ is the axial direction displacement of the rod rigid body, $\omega$ is the angular frequency, i is an imaginary unit, and G is the velocity feedback gain.

As is evident from Equation (6), the force Fa generated by the actuator is proportionate to a first order differential value of the rod axis direction displacement $x_r$, or in other words a rod axis direction velocity.

By inserting Equation (6) into Equation (4), a following Equation (7) is obtained.

$$\{-m_r\omega^2 + (c_r + G)i\omega + k_r\}x_r = Fe \qquad (7)$$

It is evident from Equation (7) that the damping term of the rod increases from $c_r$ to $c_r + G$.

Hence, according to this embodiment, the torque rod assembly 10 additionally provided with the inertial mass 15 and the actuator 17 is used in relation to a torque rod with which a double vibration proofing effect is obtained. Further, velocity feedback control is performed by the band pass filter 22 and the voltage amplification circuit 23. The transmission characteristic to the vehicle body 2 at this time is as shown in a following Equation (8), which is obtained from Equations (5) and (7).

$$\frac{Ft}{Fe} = \frac{c_r i\omega + k_r}{-m_r \omega^2 + (c_r + G)i\omega + k_r} \quad (8)$$

In Equation (8), a coefficient of the damping term in the denominator on the right side is $c_r+G$. The coefficient of the damping term in the numerator on the right side, on the other hand, remains unvaried at $c_r$ and is not therefore affected by the increase in the damping coefficient of the denominator.

Thus, the damping coefficient can be increased so as to affect only the input Fe from the engine 1, which is transmitted via the large end portion 112, and as a result, the transmitted force decreases.

Figure 9:
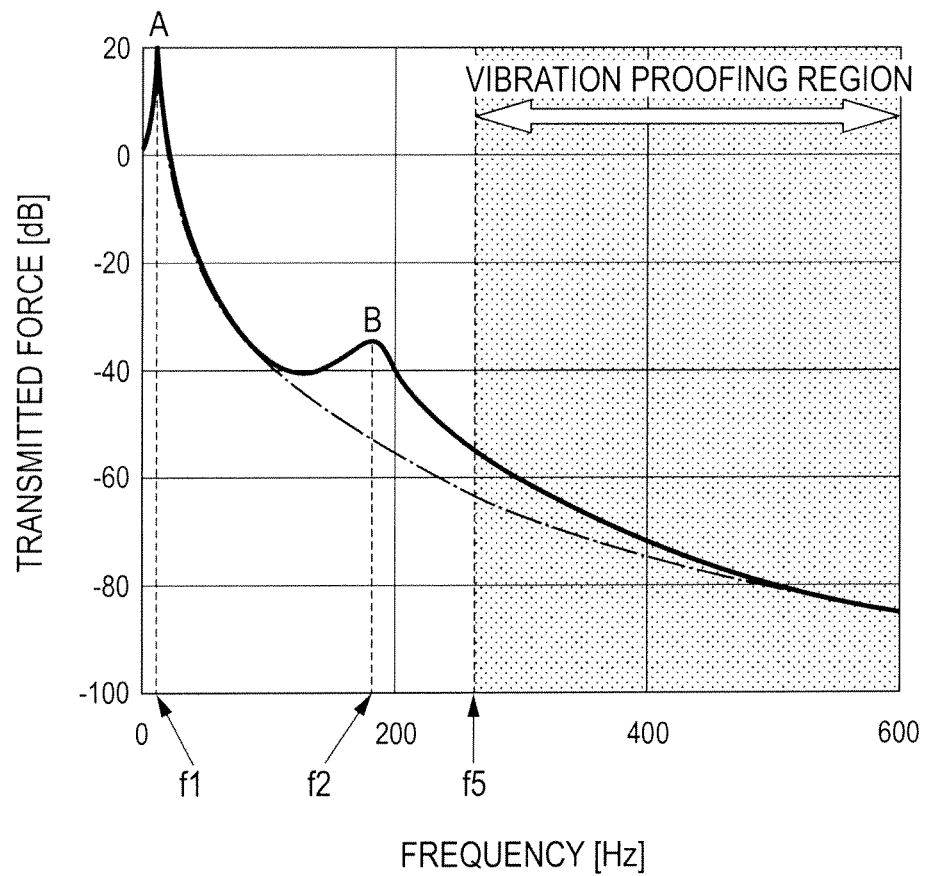
FIG. 9 is a frequency characteristic diagram showing a transmitted force generated by the torque rod assembly according to the first embodiment.

Therefore, as shown by a dot-dash line in FIG. 9, the rod rigid body resonance B can be suppressed, and a vibration proofing effect can be obtained even in a frequency band exceeding the resonance frequency $f_2$ of the rod rigid body resonance B.

It should be noted that the rod axis direction damping coefficient $c_r$ of the small end portion takes a sufficient value for obtaining a normal double vibration proofing effect, or in other words a sufficient value for ensuring that the transmitted force can be sufficiently suppressed in a higher frequency band than the rod rigid body resonance B.

Further, in the range of the frequencies passed by the band pass filter 22, damping of the rod rigid body resonance B can be improved. Hence, the gain G sufficiently reduces the transmitted force in the vicinity of the frequency of the rod rigid body resonance B. In other words, the gain G is set at a sufficient value for ensuring that the transmitted force corresponding to the rod rigid body resonance B does not increase.

Figure 10:
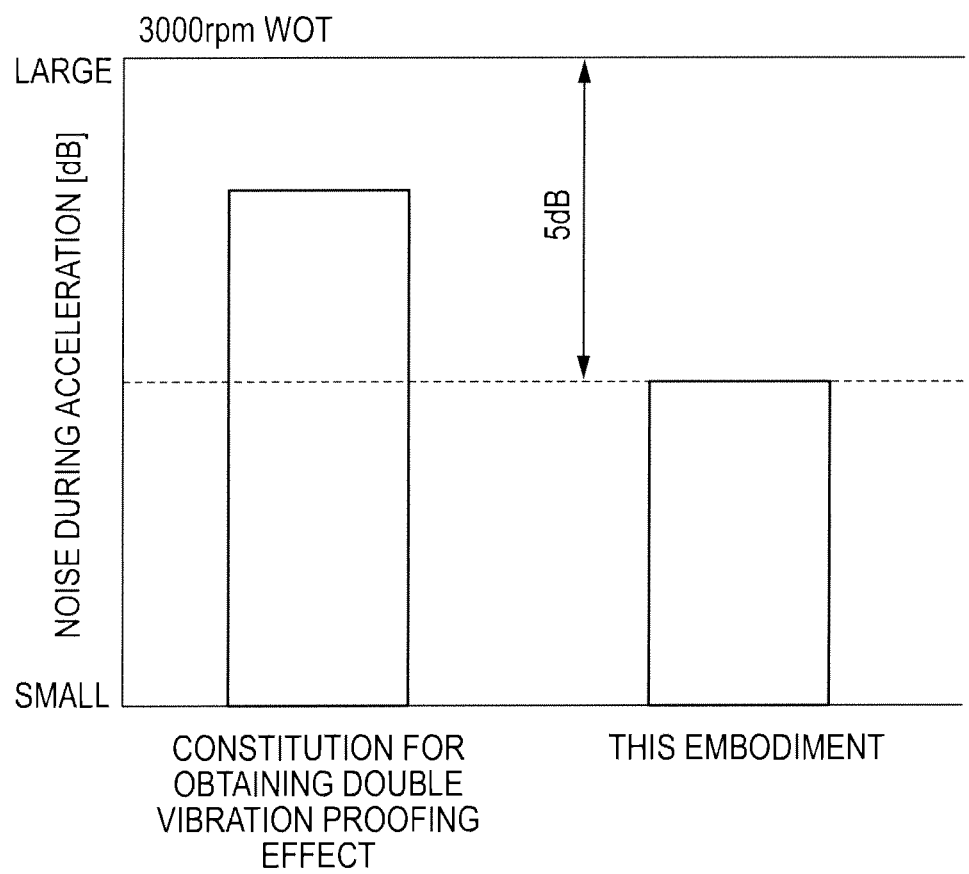
FIG. 10 is a characteristic diagram showing an effect of acceleration noise according to the first embodiment.

FIG. 10 is a diagram showing a total noise level of in-vehicle noise from 200 Hz to 1000 Hz when acceleration is performed by fully depressing an accelerator pedal under an engine rotation speed condition of 3000 rpm.

As is evident from FIG. 10, according to the constitution of this embodiment, the noise level can be reduced in addition to obtaining the double vibration proofing effect, which is obtained alone in a comparative embodiment.

The above description focused mainly on reducing vibration that is transmitted from the engine 1 to the vehicle body 2 between a medium frequency band and a high frequency band.

Next, reducing vibration transmitted from the engine 1 to the vehicle body 2 in a low frequency band will be considered. This type of vibration is transmitted as muffled noise.

Muffled noise is generated by engine vibration based on a basic order of engine rotation. The basic order of a four-cylinder engine is a rotation second order. The basic order of a six-cylinder engine is a rotation third order.

Muffled noise may be dealt with as follows. In an in-line four-cylinder engine, for example, a map shown in FIG. 11 is prepared for each engine rotation speed. An amplitude magnitude and a phase are then determined by referring to the map in accordance with the engine rotation speed. An optimum excitation force F for the engine rotation speed is then set using a following Equation (9).

$$F = A \sin(2\theta + B) \quad (9)$$

where
A is the amplitude magnitude,
B is the phase, and
$\theta$ is a crank angle.

The excitation force F of Equation (9) is then added to the force Fa generated by the actuator 17, shown in Equation (6).

Figure 12:
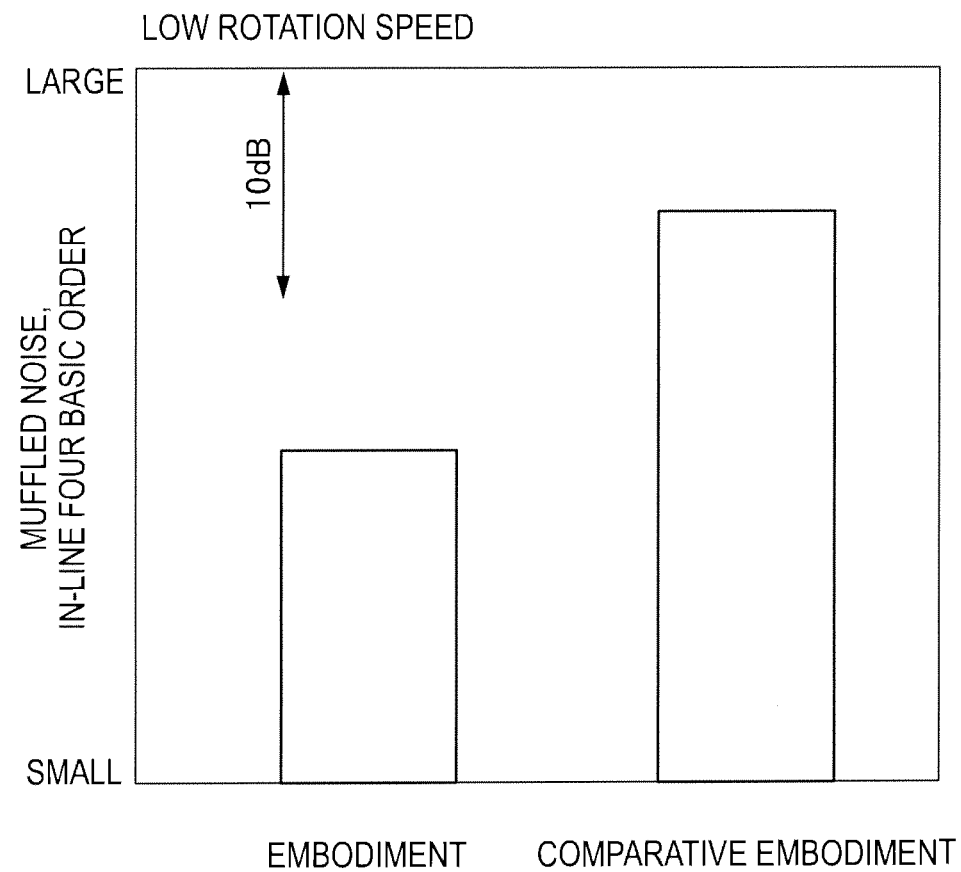
FIG. 12 is a characteristic diagram showing an effect of muffled noise according to the first embodiment.

As shown in FIG. 12, by adding the excitation force F of Equation (9) to the force Fa generated by the actuator 17 in this manner, when the engine rotation speed is low in an in-line four-cylinder engine, muffled noise (in-vehicle noise) can be reduced in comparison with a comparative embodiment in which the excitation force F of Equation (9) is not added to the force Fa generated by the actuator 17.

Hence, with the vibration reduction device according to this embodiment, both muffled noise in a low frequency band and noise generated during acceleration can be greatly reduced.

Actions and effects of this embodiment will now be described.

According to this embodiment, the rod 11 is configured such that the resonance frequency of the rod rigid body is lower than the bending and/or twisting resonance frequency of the engine, and the inertial mass 15 is caused to reciprocate in the rod axis direction by having the actuator generate a force that is proportionate to the axial direction velocity of the rod. Therefore, damping of the rod 11 can be increased while maintaining the damping characteristic of the elastic body 113c of the small end portion 113, and as a result, the rod rigid body resonance B in the rod axis direction can be suppressed while maintaining a double vibration proofing effect.

Further, according to this embodiment, signals in a predetermined frequency range including at least the resonance frequency of the rod rigid body resonance, from among the rod axis direction acceleration signals (or velocity signals), are passed by the filter, whereas signals outside of this range are not passed. Further, the actuator generates a force that is proportionate to the rod axis direction velocity on the basis of the signals passed through the filter. Hence, control is not performed at unnecessary frequencies, and therefore an improvement in control stability can be achieved. Furthermore, the transmitted force in the vicinity of the rod rigid body resonance frequency $f_2$ can be suppressed while suppressing excessive power consumption.

Moreover, according to this embodiment, the predetermined frequency range includes frequencies in a vibration proofing region (the frequency range at or above the frequency $f_5$, shown in FIG. 5) existing on a high frequency side of the frequency $f_2$ of the rod rigid body resonance B, and therefore the transmitted force can be suppressed in a frequency range extending from the rod rigid body resonance frequency $f_2$ to the vibration proofing region.

Furthermore, according to this embodiment, the predetermined frequency range includes the rod axis direction resonance frequency of the inertial mass 15, which exists on a low frequency side of the resonance frequency $f_2$ of the rod rigid body resonance B. Therefore, locally deforming high-frequency resonance is not controlled, and as a result, the control stability can be improved.

Further, according to this embodiment, the elastic coefficient of the elastic component (the plate spring 16) is determined such that the resonance frequency of the inertial mass 15 is smaller than half the rod rigid body resonance frequency $f_2$, and therefore the resonance frequency of the inertial mass 15 can be set at a sufficient distance from the rod rigid body resonance frequency $f_2$.

Moreover, according to this embodiment, the rod rigid body includes the rod shaft portion 111, the outer tube 112a fixed to one end of the rod shaft portion to serve as a constitutional component of an engine attachment portion (the large end portion 112), and the outer tube 113a fixed to the other end of the rod shaft portion to serve as a constitutional component of a vehicle body attachment portion (the small end portion 113). Further, the weight of the rod rigid body and the characteristic of the elastic body 113c, which is provided on an inner side of a vehicle body attachment portion outer tube to serve as a constitutional component of the vehicle body attachment portion, are set such that the resonance frequency of the rod rigid body is smaller than the bending and/or twisting resonance frequency of the engine. Therefore, the rod rigid body resonance frequency $f_2$ can be set appropriately for obtaining double vibration proofing in an inner/outer tube bush structure.

Furthermore, according to this embodiment, the acceleration sensor 21 is provided on the axis line of the rod 11 and on the component having the higher rigidity from among the engine attachment portion (the large end portion 112) and the vehicle body attachment portion (the small end portion 113) in order to detect the axial direction acceleration of the rod, and the voltage amplification circuit 23 is provided to amplify a signal from the acceleration sensor. Moreover, the actuator 17 causes the inertial mass 15 to reciprocate in the axial direction of the rod on the basis of a signal amplified by the voltage amplification circuit. Further, the actuator 17 is a linear motion type actuator including the core fixed to the rod shaft portion, the permanent magnet provided on the outer peripheral surface of the core, and the coil wound around the core, to which the signal amplified by the voltage amplification circuit is applied. Hence, the vehicle body attachment portion (the small end portion 113) including the high-rigidity side elastic body 113c does not have a unique mode in the frequency band to be controlled, and therefore improvements can be achieved in the control stability and a control effect by which damping of the rod 11 is increased. Further, a voltage can be applied the coil on the basis of an acceleration signal that follows the operation of the rod 11 with a high degree of precision.

Furthermore, according to this embodiment, the vibration reduction device is attached to the engine 1 mounted using the pendulum system, and it is therefore possible to control a transmission path into which the input principally enters. As a result, a great vibration/noise reduction effect is obtained.

Further, according to this embodiment, the rod shaft is installed in the vehicle horizontally. Therefore, when the actuator moves the inertial mass, the effects of gravity can be avoided. Moreover, the fixed parts between the plate springs 16 and the inertial mass 15 are parallel to the gravitational direction, and therefore the effects of gravity can likewise be avoided when the actuator moves the inertial mass.

Second Embodiment

Figure 13A:
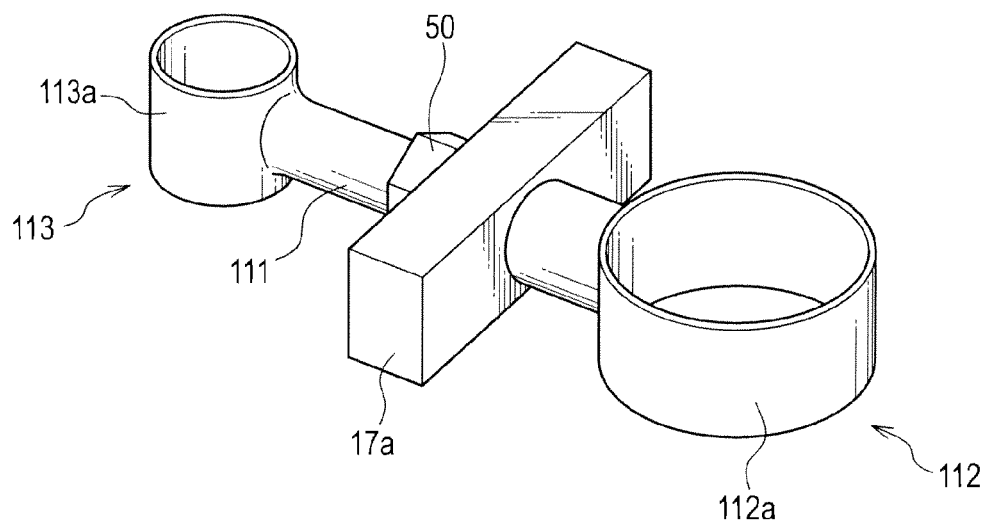
FIGS. 13A and 13B are perspective views showing a torque rod assembly according to a second embodiment.
Figure 13B:
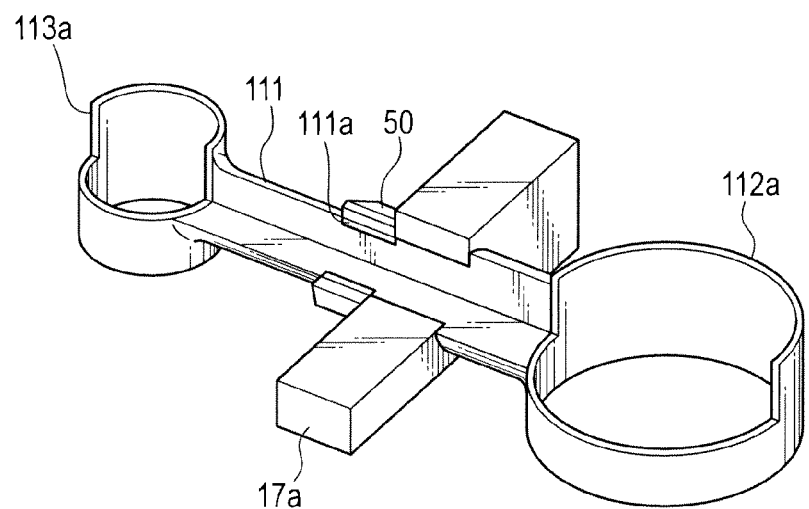

FIG. 13A is a perspective view showing a torque rod assembly according to a second embodiment. FIG. 13B is a partial sectional view of FIG. 13A.

In this embodiment, the actuator core 17a is fixed to the rod shaft portion 111 without using an adhesive.

It should be noted that FIGS. 13A and 13B show only the outer tube 112a of the large end portion 112, while the inner tube 112b and the elastic body 112c have been omitted. Further, the figures show only the outer tube 113a of the small end portion 113, while the inner tube 113b and the elastic body 113c have been omitted. The figures show only the core 17a of the actuator 17, while the coil 17b and the permanent magnet 17c have been omitted.

The rod shaft portion 111 has a thick diameter on the large end portion 112 side. An opposite side thereof has a narrow diameter formed via a step portion. The narrow diameter of the rod shaft portion 111 is identical to an inner diameter of the actuator core 17a. A male screw 111a is formed in a predetermined position in the narrow diameter part of the rod shaft portion 111.

The torque rod assembly is manufactured as follows.

First, the actuator core 17a is inserted into the rod shaft portion 111 so as to impinge on the step portion.

Next, the actuator core 17a is fixed by tightening a nut 50. Next, the large end portion 112 and the small end portion 113 are welded to the rod shaft portion 111.

Other components are then added.

When an adhesive is used, the adhesive may deteriorate in a high temperature environment.

According to this embodiment, the actuator core 17a is fixed without using an adhesive, and therefore an improvement in durability can be achieved.

Third Embodiment

Figure 14:
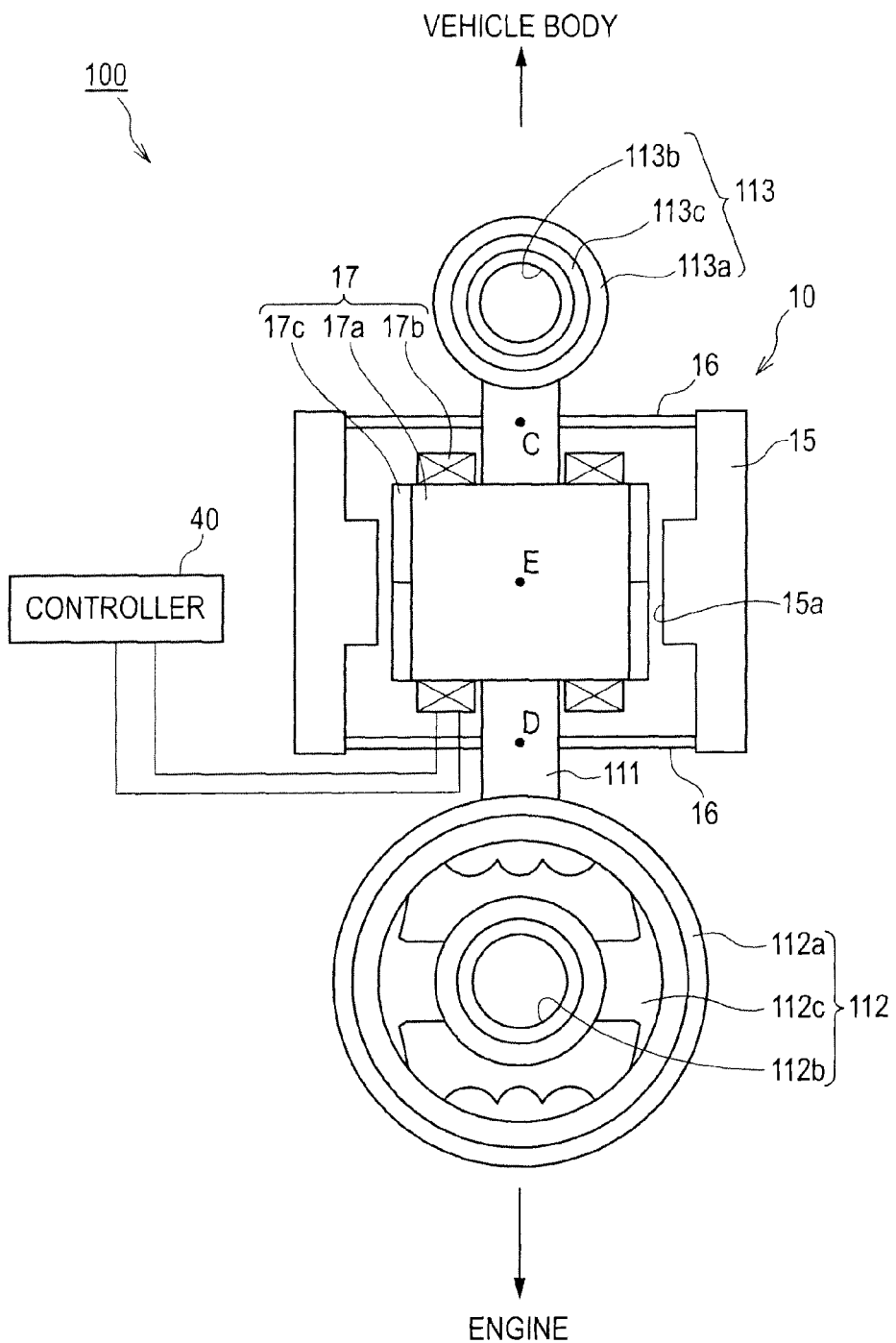
FIG. 14 is a schematic plan view showing a torque rod assembly according to a third embodiment.

FIG. 14 is a schematic plan view showing a torque rod assembly 6 according to a third embodiment. Identical parts to the first embodiment have been allocated identical numerals.

In the first embodiment, the acceleration sensor 21, the band pass filter 22, and the voltage amplification circuit 23 are used, but in the third embodiment, a controller 40 constituted by a microcomputer and a memory is used instead. The constitution whereby the inertial mass 15 and the actuator 17 are added to a constitution with which a double vibration proofing effect is obtained is similar to that of the first embodiment.

Figure 15:
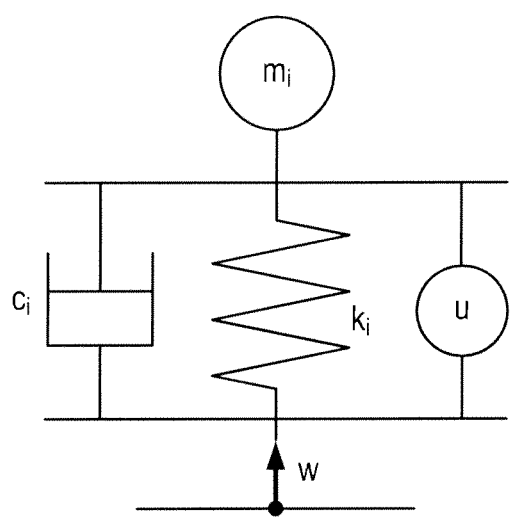
FIG. 15 is a diagram showing a physical model in which the torque rod assembly according to the third embodiment is applied to a one degree of freedom vibration system.

In the third embodiment, as shown in FIG. 15, the vibration reduction device is modeled as a one degree of freedom vibration system in which a forced displacement is received in the attachment point of the inertial mass 15. The attachment point of the inertial mass 15 corresponds to an E point in FIG. 14.

On a model of a one degree of freedom vibration system, respective equations of motion of the inertial mass 15 and the rod 11 may be expressed by following Equations (8) and (9).

$$m_i\ddot{x}+c_i\dot{x}+k_i x=u+w \qquad (8)$$

where $m_i$ is the weight of the inertial mass, $c_i$ is a rod axis direction damping coefficient of the plate spring, $k_i$ is a rod axis direction rigidity of the plate spring, x is a rod axis direction displacement of the inertial mass, $x_0$ is an axial direction displacement of the rod, u is a control force of the actuator, and w is a disturbance.

When Equation (8) and Equation (9) are converted into state space expressions using the rod axis direction acceleration x of the inertial mass 15 as an output, following Equations (10-1) and (10-2) are obtained.

$$\begin{bmatrix} \ddot{x} \\ \dot{x} \\ \dot{x}_0 \end{bmatrix} = \begin{bmatrix} -\frac{c_i}{m_i} & -\frac{k_i}{m_i} & 0 \\ 1 & 0 & 0 \\ 0 & 0 & -\frac{k_i}{c_i} \end{bmatrix} \begin{bmatrix} \dot{x} \\ x \\ x_0 \end{bmatrix} + \begin{bmatrix} \frac{1}{m_i} \\ 0 \\ 0 \end{bmatrix} u + \begin{bmatrix} \frac{1}{m_i} \\ 0 \\ \frac{1}{c_i} \end{bmatrix} w \ldots$$

$$[\ddot{x}] = \begin{bmatrix} -\frac{c_i}{m_i} & -\frac{k_i}{m_i} & 0 \end{bmatrix} \begin{bmatrix} \dot{x} \\ x \\ x_0 \end{bmatrix} + \begin{bmatrix} \frac{1}{m_i} \end{bmatrix} u + \begin{bmatrix} \frac{1}{m_i} \end{bmatrix} w \ldots$$

On the basis of Equations (10-1) and (10-2), an observer that estimates three elements, namely the rod axis direction velocity x of the inertial mass 15, the rod axis direction displacement x of the inertial mass 15, and the rod axis direction displacement $x_0$ of the attachment point of the inertial mass 15, can be created from the rod axis direction acceleration ẍ of the inertial mass 15 and the control force u of the actuator 17.

Further, by subjecting the estimated rod axis direction displacement $x_0$ of the attachment point of the inertial mass 15 to first order differentiation, a rod axis direction velocity $\dot{x}_i$ of the attachment point of the inertial mass 15 can be estimated. Hence, quantities of state of the rod axis direction displacement of both the inertial mass 15 and the rod 11 are estimated by an observer.

In the third embodiment, the rod axis direction acceleration ẍ of the inertial mass 15 is detected, and using the equation $$u_v = -G_1 \dot{x}_0 \quad (11)$$

or in other words by multiplying the rod axis direction velocity $\dot{x}_0$ of the attachment point of the inertial mass 15 by a gain $G_1$, a force $u_v$ having a reversed sign is input into the rod 11 serving as the control subject.

At this time, a rod axis direction velocity that has been passed through a similar filter to that of the first embodiment may be employed as the rod axis direction velocity used in the calculation. More specifically, a rod axis direction velocity $\dot{x}_0$ that has been passed through a filter that passes signals including the rod axis direction resonance frequency of the inertial mass 15 and extending from this resonance frequency to the frequency range of the vibration proofing region relating to the rod rigid body resonance B, and that passes signals within the vibration proofing region up to an upper limit of a range in which the control is not dispersed, may be used.

Hence, control is not performed at unnecessary frequencies, and therefore an improvement in control stability can be achieved. Furthermore, the transmitted force can be suppressed reliably in the target frequency range while suppressing excessive power consumption.

Here, a control force u of the actuator 17 relative to the force $u_v$ input into the rod 11 serving as the control subject is expressed by a following Equation (12).

$$u = c_i(\dot{x} - \dot{x}_0) + k_i(x - x_0) - u_v \quad (12)$$

The rod axis direction acceleration ẍ of the inertial mass 15 is detected from a counter electromotive force of the actuator 17.

Figure 16:
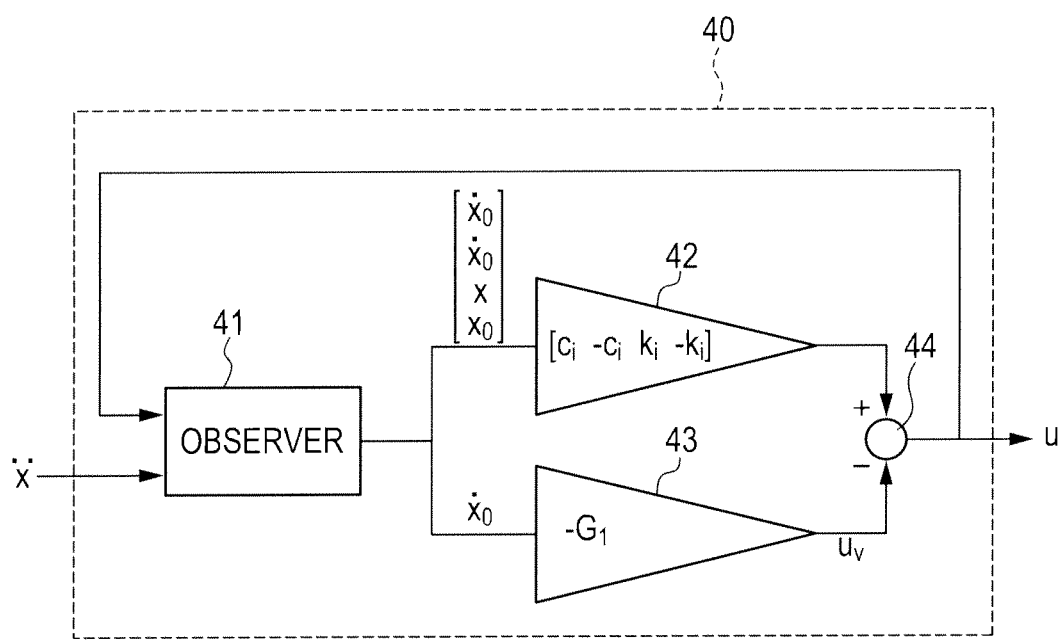
FIG. 16 is a schematic constitutional diagram of a controller according to the third embodiment.

For this purpose, as shown in FIG. 16, the controller 40 includes an observer 41, an integrator 42, an integrator 43, and a subtractor 44.

The observer 41 estimates the rod axis direction velocity $\dot{x}_0$ of the attachment point of the inertial mass 15. The integrator 43 then determines the force $u_v$ input into the rod 11 using Equation (11).

Further, the observer 41 estimates four elements, namely the rod axis direction velocity ẋ of the inertial mass 15, the axial direction velocity $\dot{x}_0$ of the rod 11 at the attachment point of the inertial mass 15, the rod axis direction displacement x of the inertial mass 15, and the axial direction displacement $x_0$ of the rod 11 at the attachment point of the inertial mass 15. The integrator 42 then forms a scalar by multiplying a row vector having $c_i$, $-c_i$, $k_i$, $-k_i$ as elements by a column vector of the aforesaid four elements.

The subtractor 44 determines the control force u by subtracting the rod input $u_v$ from the scalar, or in other words using Equation (12).

A current corresponding to the control force u is then applied to the coil 17b, whereby the actuator 17 generates the control force u.

The third embodiment differs from the first embodiment in that the acceleration sensor 21 is not provided. Further, in the third embodiment, the observer 41 is used, the gain $G_1$ is multiplied by the rod axis direction velocity $\dot{x}_0$, and the force $u_v$ having a reversed sign is input into the rod 11 serving as the control subject. Hence, velocity feedback is not performed in the manner of the first embodiment.

Therefore, a control circuit constitution of the third embodiment differs from a control circuit constitution of the first embodiment, which includes the band pass filter 22 and the voltage amplification circuit 23.

In the third embodiment, the control force u determined by the controller 40 on the basis of the rod axis direction acceleration 1 of the inertial mass 15 is generated by the actuator 17.

With the third embodiment, an identical effect to that of the first embodiment, indicated by the dot-dash line in FIG. 9, is obtained. As a result, an identical noise reduction effect during acceleration to that of the first embodiment, shown in FIG. 7, is obtained. It should be noted that when the coil 17b is controlled by a control amount based on a velocity, or in other words a control amount determined by multiplying a gain by a velocity, the current is controlled.

The third embodiment includes the observer 41 that estimates quantities of state of the rod axis direction displacement of the inertial mass 15 and the rod, including at least the axial direction velocity $\dot{x}_o$ of the rod, on the basis of the rod axis direction acceleration ẍ of the inertial mass 15 and the control force u of the actuator, the rod input generation unit 43 that generates the force $u_v$ having a reversed sign as the rod input by multiplying the gain $G_1$ by a velocity signal $\dot{x}_0$ output from the observer 41, and the actuator control force calculation unit 44 that calculates the control force u of the actuator on the basis of the rod input generated by the rod input generation unit 43, the quantities of state of the axial direction displacement of the inertial mass 15 and the rod, estimated by the observer 41, and the rod axis direction damping $c_i$ and rigidity $k_i$ of the elastic component (the plate spring 16), and therefore similar effects to those of claim 1 can be obtained without using the acceleration sensor 21. In other words, damping of the rod 11 can be increased while maintaining the damping characteristic of the elastic body 113c of the small end portion 113, making it possible both to suppress the rod rigid body resonance B in the rod axis direction and achieve double vibration proofing.

Further, according to the third embodiment, the rod axis direction acceleration of the inertial mass 15 is detected from the counter electromotive force of the actuator 17, and therefore the need to attach the acceleration sensor 21 is eliminated, enabling a reduction in cost.

This invention is not limited to the embodiments described above and may be subjected to various modifications and amendments within the scope of the technical spirit of the invention, such modifications and amendments naturally being included within the technical scope of the invention.

For example, in the above embodiments, the large end portion 112 is fixed to the engine and the small end portion 113 is fixed to the vehicle body side, but the large end portion 112 may be fixed to the vehicle body side and the small end portion 113 may be fixed to the engine. Further, in a lower side torque rod assembly, as shown in FIG. 1, a bolt inserted into the inner tube 112b and a bolt inserted into the inner tube 113b are parallel to each other, whereas in an upper side torque rod assembly, a bolt inserted into the inner tube 112b and a bolt inserted into the inner tube 113b are orthogonal to each other. However, either arrangement may be employed.

With respect to the above description, the contents of Japanese Patent Application No. 2009-157563, with a filing date of Jul. 2, 2009 in Japan, are incorporated herein by reference.

Exclusive properties or features encompassed by the embodiments of this invention are as claimed below.

The invention claimed is:

1. A vibration reduction device comprising:
a rod rigid body supported between an engine and a vehicle body via respective elastic bodies, a resonance frequency of which is set to be lower than a bending and/or twisting primary resonance frequency of the engine;
an elastic component that is provided on the rod rigid body and caused to deform by a force acting in an axial direction of the rod rigid body;
an inertial mass supported by the elastic component; and
an actuator that causes the inertial mass to reciprocate in the axial direction of the rod rigid body by generating a force that is proportionate to an axial direction velocity of the rod rigid body.

2. The vibration reduction device as defined in claim 1, further comprising a filter that passes signals in a predetermined frequency range including at least a resonance frequency of a rod rigid body resonance, from among axial direction acceleration signals or velocity signals of the rod rigid body, but does not pass signals outside of this range,
wherein the actuator generates the force that is proportionate to the axial direction velocity of the rod rigid body on the basis of a signal passed through the filter.

3. The vibration reduction device as defined in claim 2, wherein the predetermined frequency range includes frequencies in a vibration proofing region existing on a high frequency side of the resonance frequency of the rod rigid body resonance.

4. The vibration reduction device as defined in claim 2, wherein the predetermined frequency range includes a rod axis direction resonance frequency of the inertial mass, which exists on a low frequency side of the resonance frequency of the rod rigid body resonance.

5. The vibration reduction device as defined in claim 1, comprising:
an acceleration sensor that is disposed on an axis line of the rod rigid body and on a component having a higher rigidity from among an engine attachment portion and a vehicle body attachment portion in order to detect an axial direction acceleration of the rod rigid body; and
a voltage amplification circuit that amplifies a signal from the acceleration sensor,
wherein the actuator is a linear motion type actuator comprising a core fixed to a shaft portion of the rod rigid body, a permanent magnet provided on an outer peripheral surface of the core, and a coil wound around the core, to which the signal amplified by the voltage amplification circuit is applied, whereby the actuator causes the inertial mass to reciprocate in the rod axis direction on the basis of the signal amplified by the voltage amplification circuit.

6. The vibration reduction device as defined in claim 1, comprising:
an observer that estimates quantities of state of a rod axis direction displacement of the inertial mass and the rod rigid body, including at least the axial direction velocity of the rod rigid body, on the basis of a rod axis direction acceleration of the inertial mass and a control force of the actuator;
a rod input generation unit that generates a force having a reversed sign as a rod input by multiplying a gain by a velocity signal output from the observer; and
an actuator control force calculation unit that calculates a control force of the actuator on the basis of the rod input generated by the rod input generation unit, the quantities of state of the axial direction displacement of the inertial mass and the rod rigid body, estimated by the observer, and a rod axis direction damping and rigidity of the elastic component.

7. The vibration reduction device as defined in claim 6, wherein the rod axis direction acceleration of the inertial mass is detected from a counter electromotive force of the actuator.

8. The vibration reduction device as defined in claim 1, wherein an elastic coefficient of the elastic component is determined such that a resonance frequency of the inertial mass is smaller than half the rod rigid body resonance frequency.

9. The vibration reduction device as defined in claim 1, wherein a weight of the rod rigid body and a characteristic of the elastic body are set such that the resonance frequency of the rod rigid body is smaller than the bending and/or twisting primary resonance frequency of the engine.

10. The vibration reduction device as defined in claim 1, wherein a shaft portion of the rod rigid body includes a thick diameter part and a narrow diameter part that is formed on an opposite side of a step portion to the thick diameter part and includes a male screw part,
the vibration reduction device further comprises a nut that is screwed to the male screw part, and
an actuator core is fastened by the nut and thereby pressed against the step portion.

11. The vibration reduction device as defined in claim 1, wherein the vibration reduction device is attached to the engine, which is mounted using a pendulum system.

12. The vibration reduction device as defined in claim 1, wherein a rod shaft of the rod rigid body is installed in a vehicle horizontally.

* * * * *